March 14, 1961 T. F. HASSELL 2,974,972
POSITIONING TRAILER
Filed Dec. 23, 1957 4 Sheets-Sheet 1

INVENTOR.
THEODORE F. HASSELL
BY
Paul A. Weilein
ATTORNEY.

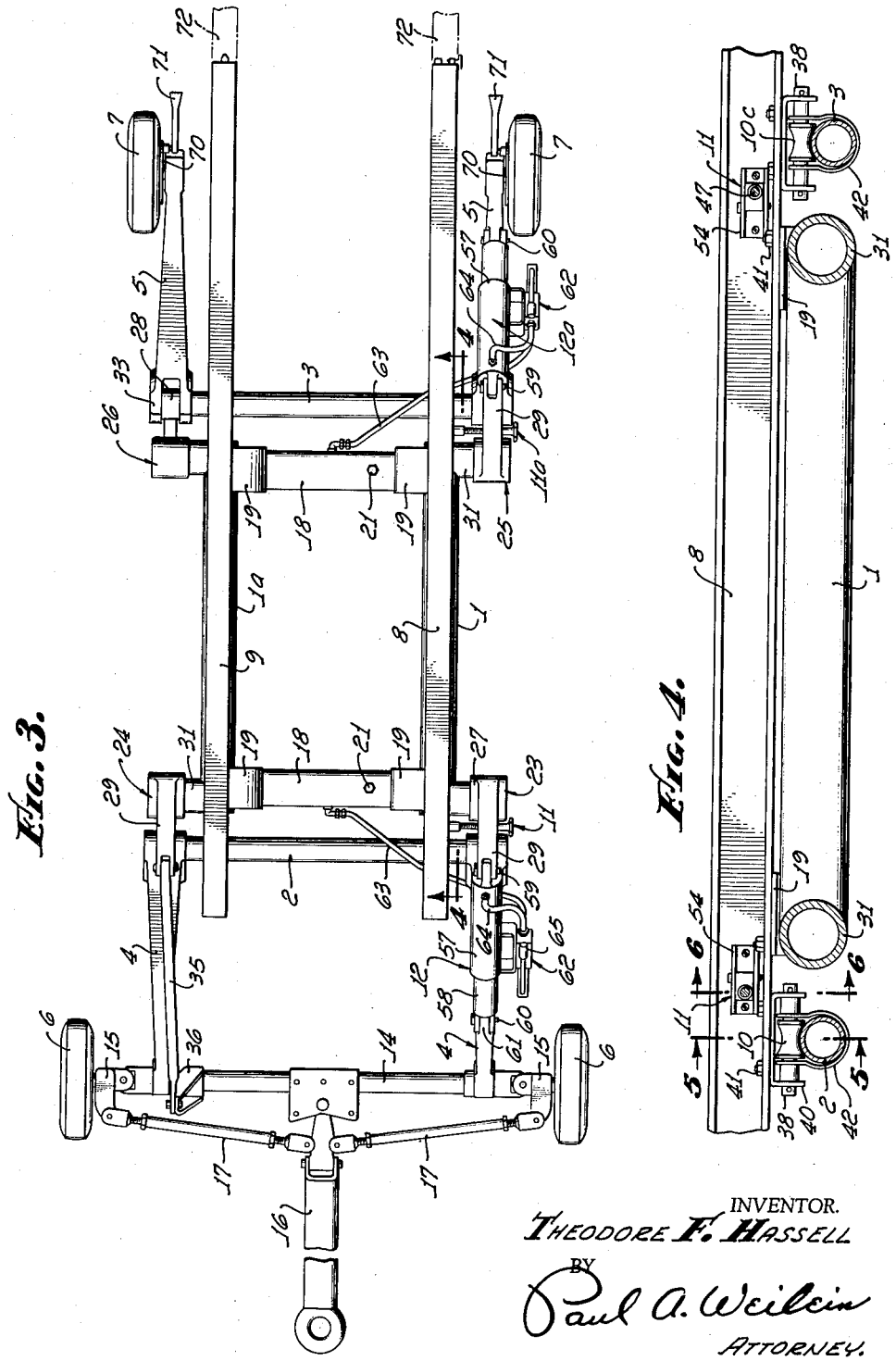

March 14, 1961  T. F. HASSELL  2,974,972
POSITIONING TRAILER
Filed Dec. 23, 1957  4 Sheets-Sheet 3

INVENTOR.
THEODORE F. HASSELL
BY
Paul A. Weilein
ATTORNEY.

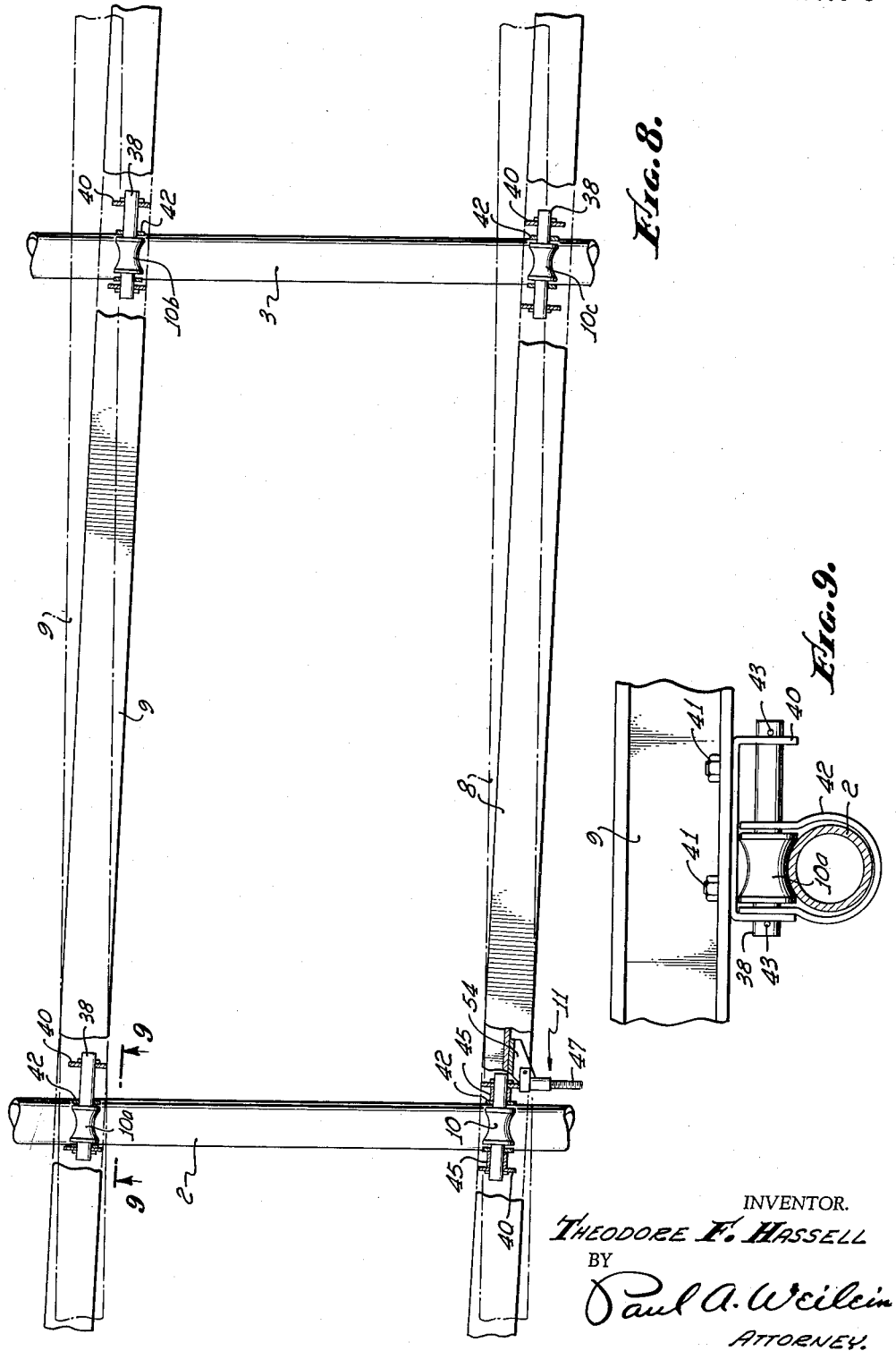

United States Patent Office 2,974,972
Patented Mar. 14, 1961

2,974,972

POSITIONING TRAILER

Theodore F. Hassell, Pasadena, Calif., assignor to Air Logistics Corporation, Pasadena, Calif., a corporation of Delaware Filed Dec. 23, 1957, Ser. No. 704,721

26 Claims. (Cl. 280—43.23)

This invention relates to mobile apparatus of use in loading and unloading aircraft as well as for moving, positioning, installing and removing aircraft components, such apparatus being known in this art as positioning trailers.

It is known that positioning trailers of the heavy duty type have been employed for handling, installing and removing aircraft engines, aircraft components and heavy cargo units. These trailers are made up of a wheel-supported frame mounting lazy-tong elevating and lowering mechanism that in turn supports adjustable frame members carrying a pair of load-supporting rails.

The raising and lowering mechanism is operated by hydraulic jacks to move the rails between a lowered position and various elevated and tilted positions.

The adjustable frames on which the rails are supported are mounted on the lazy-tong mechanism. Adjusting means are provided to move the adjustable frame and the rails laterally, also to roll the frames and rails, as about a horizontal axis, as well as to move the rails angularly as about a vertical axis to produce a yaw or misalignment of the rails relative to the longitudinal axis of the trailer. These various movements and positions of the rails are provided best to position the rails for receiving loads and having loads removed therefrom.

It is an object of this present invention to provide a positioning trailer of the character described which constitutes an improvement over such trailers as have been heretofore known, particularly in point of simplicity of construction, cost of production, ease of operation, compactness, low weight, maneuverability and efficient operation in many load-handling uses not suited to the heavy duty trailers.

It is another object of this invention to provided a positioning trailer such as described wherein a simply constructed frame is supported by wheeled struts mounted to be selectively moved into different positions for raising, lowering and tilting the frame and a load supporting structure which includes a pair of load-supporting rails mounted on the frame.

It is another object of this invention to provide a simply constructed positioning trailer of the above-mentioned type which from a broad standpoint comprises a wheeled, vertically adjustable trailer frame having load supporting rails adjustably mounted directly upon the frame for lateral and angular adjustment relative thereto. Such a structure affords substantial advantage from the standpoints of structural simplicity and economy of manufacture as compared with previously known trailers of the type here involved which have heretofore included an intermediate framework between the wheeled supporting frame and the load supporting rails or bed.

It is an additional object hereof to provide in a trailer such as described, a novel arrangement of longitudinal frame members, transverse rail-supporting members and a pair of load-supporting rails, wherein rollers are employed to mount the load-supporting rails on the rail-supporting members in such a manner that the rails may be laterally adjusted as well as angularly adjusted about a pivotal axis provided by one of the rollers, thereby providing for the desired positioning of a load as well as for aligning the rails with similar rails on another trailer or on a stand or platform, whereby loads readily may be placed, removed or transferred by the aid of the trailer.

It is another object to provide a trailer such as described wherein advantages and objects aforementioned are achieved by having longitudinal main frame members and load-supporting rails arranged so that the main frame members are closely spaced below and parallel with the rails as well as movable therewith in the raising, lowering and tilting of the rails; and by having transverse load-supporting members mounted for rotative movement at the ends of the main frame members so as to serve the triple purpose of supporting the rails, swingably supporting the struts and acting as torque members of shafts between the struts.

A further object is to provide in a trailer such as described, a simple and efficient hydraulic actuating means for swinging the wheeled struts to raise, lower and tilt the main frame members and load-supporting rails as a unit, this actuating means including hydraulic jacks operatively connected to the main frame members and to struts on one side only of the trailer, there being manually operable pumps on such struts, for operating the jacks. With this arrangement, appropriate operation of pumps causes the two struts of each pair, by reason of the aforesaid torque members therebetween, to be swung inwardly or outwardly to lower, raise or tilt the main frame member and rails.

Still another object of this invention is to provide a trailer such as described wherein novel brackets at ends of the main frame members, mount the rail-supporting members or torque shafts and dispose these shafts in outwardly spaced relation to the ends of the main frame members in position to support the load-supporting rails above the main frame members, the brackets on one side of the trailer also operatively connecting the hydraulic jacks with the main frame members.

An additional object hereof is to provide in a trailer such as described, a simple means for shifting the rails laterally in either direction as well as for moving the rails angularly in either direction about a pivotal axis provided by one of the rail-supporting rollers, this adjusting means being carried by a pair of the aforesaid end brackets on one side of the trailer and operatively engaged with the adjacent rail.

Another object of this invention is to provide a positioning trailer such as described wherein members which join the rails to form a rail unit, extend between the rails to serve as structural elements of the rail unit as well as reservoirs for hydraulic fluid.

This invention possesses many other advantages and has other objects which may be made more easily apparent from a consideration of the embodiment of the invention shown in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Fig. 3 is a top plan view of the trailer;

Fig. 4 is a sectional view taken on the line 4—4 of Fig. 3 on an enlarged scale;

Fig. 8 is a schematic top plan view with parts broken away and parts in section, showing in full and dot-dash lines the positions of the load-supporting rails and the supporting rollers therefor when the rails are adjusted in a particular manner; and Fig. 9 is an enlarged sectional view taken on the line 9—9 of Fig. 8.

Figure 1:
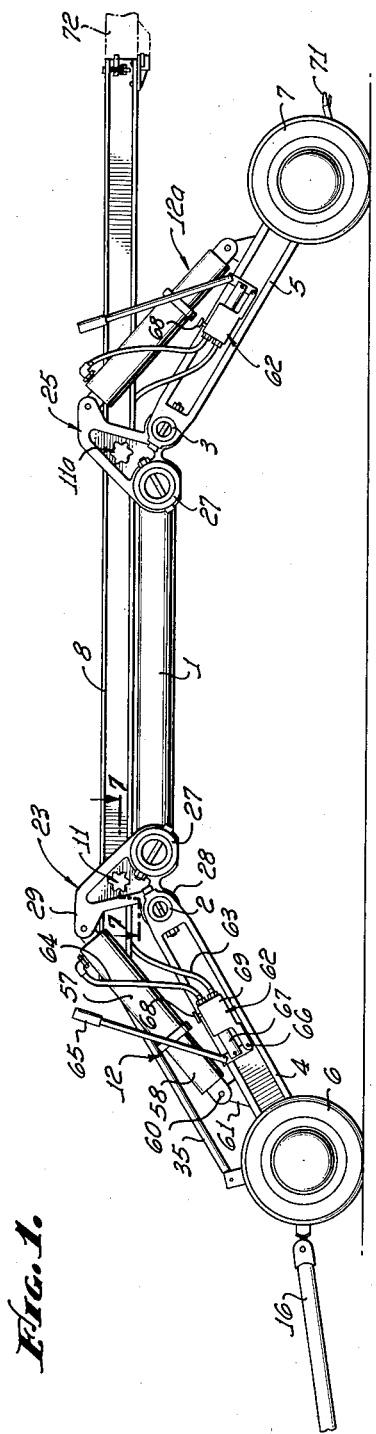
Fig. 1 is a side elevation of a trailer embodying the present invention showing in dot-dash lines how load-supporting rails thereon may be coupled to rails of another trailer for transferring loads.

A preferred embodiment of a trailer made in accordance with this invention is shown in the accompanying drawings. The principal parts of this trailer first will be generally described and thereafter more specifically defined as to the construction, relative arrangement and functions thereof.

Generally, the trailer here shown includes a pair of longitudinal main frame members 1 and 1a to which are joined front and rear transverse members 2 and 3. These transverse members are mounted to serve as structural elements for joining the frame members and as torque members or shafts at the ends of the main frame members. Also the torque members 2 and 3 have front and rear pairs of struts 4 and 5 fixed thereto, the struts carrying the pairs of front and rear wheels 6 and 7 for supporting the trailer. In addition to supporting the struts, the members 2 and 3 serve as support for a loading bed which includes a pair of load-supporting rails 8 and 9 mounted on rollers 10, 10a, 10b and 10c which ride on the members 2 and 3 whereby the rails may be adjusted laterally, also moved angularly about a pivotal axis provided by one of the rollers. This pivotal axis is normal to the axis proper of the aforesaid one roller. These movements of the rails are effected by manipulation of rail adjusting means 11 and 11a which will be hereinafter fully described.

The raising, lowering and tilting of the main frame members 1 and 1a and the rails 8 and 9, best to position the rails for receiving a load or having a load removed therefrom, is effected by hydraulically operable ram or other suitable extensible means 12 and 12a operable to swing the struts and wheels thereon into different positions.

An axle 14 is carried by the front struts 4 and mounts steering knuckles 15 which support the front wheels 6 so that the trailer may be steered according to manipulation of a draw bar 16. This draw bar is pivotally and detachably connected with the axle 14, also connected by steering links 17 with the knuckles 15 for turning the latter to steer the trailer.

As here shown, the main frame members 1 and 1a are tubular and joined in laterally spaced relation one to the other by means of the front and rear rail-supporting torque members 2 and 3 which latter are also tubular and disposed in outwardly spaced relation to the ends of the main frame members so that the front and rear struts 4 and 5 may be fixed thereto and the load-supporting rails 8 and 9 may be supported thereon. The rails 8 and 9 are joined intermediate their ends by transverse hollow members 18 and rigid brackets 19 which latter are bolted as at 20 to the under sides of the rails and extend laterally inwardly and downwardly to the members 18, being welded or otherwise fixed thereto whereby the members 18 are well below the plane of the lower sides of the rails. This arrangement provides ample load-accommodating space below and between the rails. The tubular members 18 are constructed to serve as reservoirs for hydraulic fluid, there being filling openings (not shown) therein, closed by removable caps 21.

The means employed for joining the torque members 2 and 3 to the frame members 1 and 1a includes four brackets 23, 24, 25 and 26 mounted on the ends of the main frame members 1 and 1a. Each of these brackets includes a tubular body 27 and a bearing portion 28. The brackets 23 and 24 are located on the front end of the frame members 1 and 1a respectively, whereas the brackets 25 and 26 are located on the rear ends of these frame members. The brackets 23, 24 and 25 are provided with rigid arms 29 joined to the bodies 27 and bearing portions 28 and extending upwardly and outwardly therefrom.

The bodies 27 of the four brackets are fixed by means of pins 30 on lateral projections 31 of the frame members 1 and 1a.

The bearing portions 28 of the brackets 23, 24, 25 and 26 rotatably support therein the transverse torque members 2 and 3, with the latter in outwardly spaced relation to the ends of the main frame members 1 and 1a. The outer ends of the torque members 2 and 3 extend laterally outwardly from the bearing portions 28 for supporting the struts 4 and 5. These struts have bifurcated upper ends forming opposed apertured ears 33 which straddle the bearing portions 28 and receive the end portions of torque members 2 and 3. As here shown, bolts 34 are employed to fix these ears to the torque members whereby the struts will swing with rotation of the torque members.

The bracket arm 29 of the bracket 24 on the front end of the frame member 1a, mounts one end of a rigid stabilizing rod 35, the other end of this rod being connected to an upstanding arm or bracket 36 rigidly mounted on the axle 14. The rod 35 serves to maintain proper vertical relationship of the steering wheel supports.

The bracket arms 29 of the brackets 23 and 25 located on the ends of the main frame member 1, cooperate with the front and rear struts 4 and 5 on one side of the trailer, for mounting the hydraulically operable means 12 and 12a which latter will be hereinafter more fully described. These bracket arms 29 also cooperate with the main frame member 1 for mounting the adjusting means 11 and 11a for shifting the rails 8 and 9.

The rollers 10, 10a, 10b and 10c for mounting the rails 8 and 9 on the torque members 2 and 3 make it possible for the simply constructed rail-adjusting means 11 and 11a to be manually operated to shift the rails when the latter are loaded as well as when unloaded. As shown in Figs. 4 and 9, these rollers are flanged and mounted on shafts 38 supported by brackets 40 bolted as at 41 to the under sides of the bases of the rails 8 and 9. Pins 43 hold the shafts 38 against axial movement relative to the brackets 40.

U-shaped straps 42 of suitable metal are mounted on the shafts 38 to form loops embracing the torque members 2 and 3. These straps hold the rollers on the torque members 2 and 3 and restrain upward movement of the rails 8 and 9 relative to the members 2 and 3. The ends of the straps 42 are apertured and disposed on opposite sides of the rollers, the shafts 38 extending freely through these apertured ends and the rollers. Clearance is provided between the straps 42 and the members 2 and 3 surrounded by the strap, whereby limited movement of the straps relative to the members 2 and 3 will take place as required when rails 8 and 9 are angularly adjusted about one of the rollers.

In order that the rails 8 and 9 may be moved angularly in either direction about an axis which is provided by one of the rail-supporting rollers, for example the roller 10, the other rollers 10a, 10b and 10c and the shaft 38 therefor are relatively axially movable, the shafts sliding freely through these rollers and the associated straps 42, responsive to such angular movement of the rails. The roller 10 is mounted so that but a comparatively slight relative movement between it and the shaft 38 therefor is permitted, there being spacer sleeves 45 on this shaft between the ends of the associated bracket 40 and strap 42 to restrain additional relative movement. This mounting of the roller 10 makes it possible for the rails 8 and 9 to be moved angularly about a vertical axis which is provided by the roller 10. All of the rollers remain in proper position on the torque members 2 and 3 without binding during this angular adjustment of the rails about the aforesaid pivotal axis provided by the roller 10. This proper positioning of the rollers is due to slight clearance provided between the shafts and rollers and the sliding movement of the shafts 38 relative to the rollers 10a, 10b and 10c. The pivotal axis about which the rails are angularly movable is made possible due to the small turning radius of the rails relative to the roller 10 and to the relative axial movement permitted between the other rollers and the shafts 38 therefor, as will be apparent with reference to Fig. 8. The purpose of this angular adjustment of the rails 8 and 9 is to bring the rear ends of the rails to a position best to provide for moving a load therefrom or thereon or for aligning the rails with other rails on a trailer or elsewhere, for transferring a load. As here shown, the rails may be moved on a radius about roller 10 for example, between zero degrees with the rails longitudinally aligned with the frame members 1 and 1a, as shown in broken lines in Fig. 8 and about 3 degrees in either direction, the rails being shown at the limit of its angular adjustment in one direction in full lines in Fig. 8. This range of adjustment, namely a total of about 6 degrees has been found to be adequate but it obviously may be varied, if desired.

Figure 7:
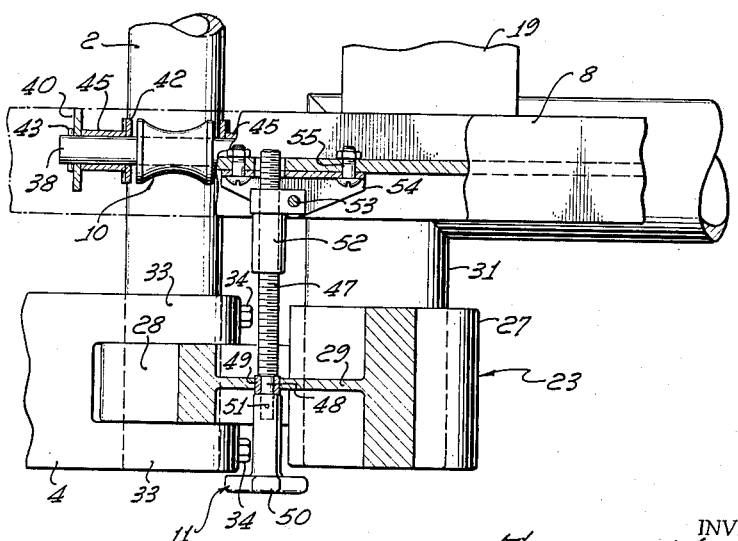
Fig. 7 is an enlarged fragmentary sectional view taken on the line 7—7 of Fig. 1, with portions broken away for clarity of illustration.

The adjusting means 11 and 11a for shifting the rails 8 and 9 on the torque members 2 and 3 as shown in Figs. 3, 5, 6 and 7 are mounted adjacent the ends of the frame member 1 and are identical and independently operable. As shown in Fig. 7, each adjusting means 11 includes an adjusting screw 47 having a reduced unthreaded end 48 rotatable freely in a bearing 49 carried by the associated corner bracket 29. A handle 50 is secured on the end 48 of the screw 47 by means of a pin 51, whereby the screw may be turned. An internally screw threaded sleeve nut 52 is pivoted as at 53 on a bracket 54 fastened by bolts 55 to the web of the adjacent rail 8, the screws 47 being threadedly engaged with the sleeve nut 52. With this arrangement, the turning of the screw 47 of the adjusting means 11 and 11a will move the rails relative to the transverse members 2 and 3. Angular adjustment of the rails about the axis of the roller 10 may be effected by oppositely adjusting the screws 47 of the adjusting means 11 and 11a or by adjusting the screw 47 of adjusting means 11a only.

It should be noted that the spacing of the corner brackets 23, 24, 25 and 26 from the rails 8 and 9 permits of the desired lateral and angular adjustment of the rails. These brackets extend above the plane of the lower sides or bases of the rails 8 and 9 and would act as stops to prevent undue lateral displacement of the rails in case of failure of the adjusting screws 47 to hold the rails in the desired position.

Referring now to the means 12 and 12a for swinging the struts 4 and 5 to raise, lower and tilt the frame members 1 and 1a and rails 8 and 9 as a unit, it is seen that each of such means in the illustrative embodiment includes a hydraulic jack or ram comprising a cylinder 57 and a plunger 58. Each cylinder 57 is pivoted as at 59 at one end to the bracket arm 29 of the adjacent corner bracket on the frame member 1. Each plunger 58 is operable in the cylinder 57 and pivoted at its outer end as at 60 to an upstanding lug 61 fixed on an adjacent strut 4 or 5, as the case may be.

Manually operable hydraulic pump units 62 are fixed on the sides of the struts 4 and 5 which mount the jack cylinders 57. Each pump unit 62 is connected by a flexible hose line 63 with one of the hydraulic fluid reservoir members 18, also connected by a similar flexible hose line 64 with one of the jack cylinders 57. An operating lever 65 is pivoted as at 66, on each pump unit 62 for actuating the pump plunger 67. A manually operable valve 68 in each pump cylinder 69 provides for releasing fluid from the associated jack cylinder 57 when it is desired to lower or tilt the frame members 1 and 1a, rails 8 and 9 as a unit. The raising and tilting of this frame member-rail unit is effected by actuating the pump units 62 to develop fluid pressure in the jacks. Two operators on one side of the trailer usually are required to operate the two pumps for raising, lowering and tilting the frame members 1 and 1a and rails 8 and 9 as a unit.

Suitable brake units 70 embodied in the rear wheels 7, are operable by means of pedals 71 shown in Fig. 3. With this arrangement an operator or attendant readily may stop the rolling of the trailer or may hold the trailer against rolling out of the desired position by manipulating the pedals 71 to set the brakes.

Fig. 1 shows a typical running position of the trailer, wherein the struts 4 and 5 are extended outwardly to dispose the rails 8 and 9 at a given elevation. If it is desired to increase the elevation of the rails 8 and 9, the two pump units 62 are operated alike to actuate the plungers 58 in the jack cylinders 57, for retracting the struts 4 and 5 to the desired position.

Figure 2:
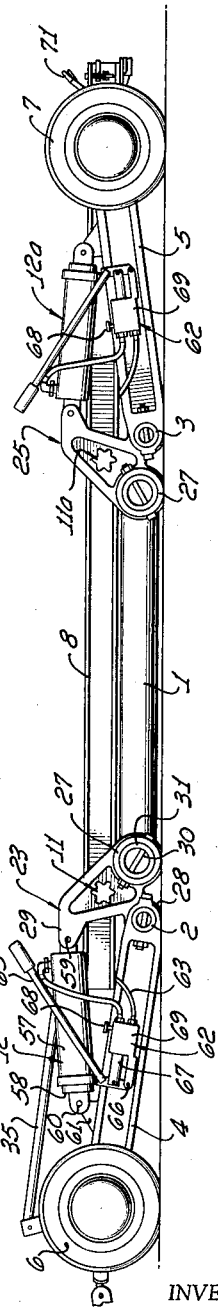
Fig. 2 is a side elevation of the trailer as it would appear when collapsed for shipment or storage.
Figure 5:
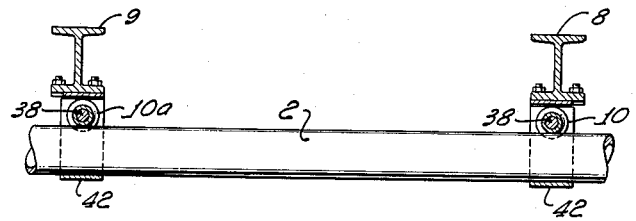
Fig. 5 is a fragmentary sectional view taken on the line 5—5 of Fig. 4.
Figure 6:
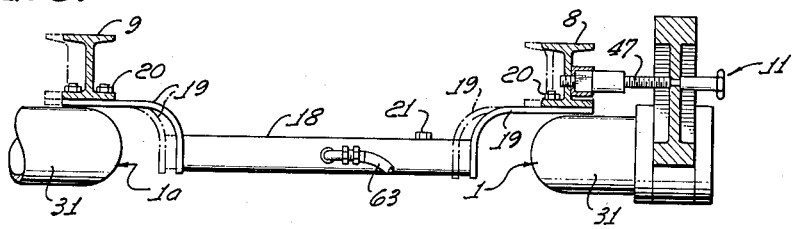
Fig. 6 is a fragmentary sectional view taken on the line 6—6 of Fig. 4, showing in dot-dash lines the load-supporting rails in an adjusted position.

Fig. 2 shows the trailer in fully collapsed position into which it may be moved for storage or shipment purposes or in fact for receiving some types of loads. In this position, the corner brackets 23, 24, 25 and 26 rest on the surface supporting the trailer and the struts are fully extended with the wheels 6 and 7 still in contact with the surface supporting the trailer.

Movement of the trailer parts from the elevated position shown in Fig. 1, or from any other elevated position, to a lowered position, or to the fully collapsed position shown in Fig. 2, is effected by manipulating the pump valves 68 to release hydraulic fluid from the jack cylinders 57, through the pumps and back into the reservoir members 18, the weight of the frame members 1 and 1a, the rails 8 and 9 and associated elements, causing these parts to gravitate into a lowered position under control by the fluid release valves 68.

The tilting of the rails 8 and 9 and the frame members 1 and 1a, to dispose one end of the rail unit lower than the other, for desired positioning of a load on the rails or the positioning of the rails best to receive a load, is effected by relative positioning of the front and rear struts 4 and 5, either by appropriate differential operation of the two pumps 62 or by appropriate differential operation of the release valves.

Lateral adjustment of the rails 8 and 9 in either direction for the desired positioning thereof best to receive or discharge a load or for aligning the rails with rails of another trailer, such for example as the rails 72 indicated in dot-dash lines at the right end of Fig. 1 and Fig. 3, is readily effected by appropriate operation of the adjusting screws 47 of the adjusting means 11 and 11a.

When it is desired to yaw the rails 8 and 9 as a unit, that is to misalign the rear ends of the rails in either direction relative to the frame members 1 and 1a, to facilitate loading and unloading operations, this is accomplished by appropriate turning of the screws 47 individually or oppositely depending upon the degree of the adjustment necessary. Operation of the screws 47 in this manner will cause the rails 8 and 9 as a unit to move angularly about a vertical axis formed by the roller 10, thereby providing for the desired yawing of the rails.

A typical angular adjustment of the rails 8 and 9 is indicated in Fig. 8, which shows how the shafts 38 for the rollers 10a, 10b and 10c will shift axially relative to these rollers during the angular movement of the rails, also how shaft 38 for the roller 10 is restrained against axial movement relative thereto. With this arrangement of the rollers, the load carrying bed, that is the rails 8 and 9, the cross members 18 joining the rails, also the shafts 38 for the rollers 10a, 10b and 10c, will move bodily relative to these rollers during the aforesaid angular movement of the rails, the roller 10 providing a pivot, and the shaft 38 for the roller being restrained against axial movement in its supporting bracket 40 by bushings 45.

In consideration of the foregoing description and accompanying drawings, it will now be apparent that a trailer embodying the present invention readily and easily may be operated to raise, lower, tilt, laterally adjust and angularly position the load-supporting rails best to receive a load on the rails or have a load removed therefrom.

I claim:

1. In a trailer having frame members, front and rear pairs of wheel-supported struts, and a load-carrying bed including load-supporting rails: the improvement which includes a pair of rail-supporting members extending transversely of said frame members; means rotatably supporting said rail-supporting members on said frame members; means mounting said rails on said rail-supporting members; and means joining said struts to said rail-supporting members.

2. In a trailer having frame members; front and rear pairs of wheel-supported struts, and load-supporting rails: the improvement which includes a pair of rail-supporting members extending transversely of said frame members; means rotatably supporting said rail-supporting members on said frame members; means mounting said rails on said rail-supporting members; means joining said struts to said rail-supporting members; and means operatively connected with said frame members and said struts for swinging said struts to raise and lower said frame members and rails as a unit.

3. In a trailer having frame members; front and rear pairs of wheel-supported struts, and load-supporting rails: the improvement which includes a pair of rail-supporting members extending transversely of said frame members; means rotatably supporting said rail-supporting members on said frame members; means mounting said rails on said rail-supporting members; means joining said struts to said rail-supporting members; and means operatively connected with struts of said front and rear pairs, respectively, operable independently for swinging said pairs of struts into position for raising, lowering and tilting said frame members and rails as a unit.

4. In a wheeled trailer having frame members, load-supporting rails, and pairs of struts mounting the wheels of the trailer: the improvement which includes rail-supporting members; means joining said members to said frame members for rotative movement relative to said frame members; means mounting said rails on said rail-supporting members; means fixing said struts to said rotative rail-supporting members for swinging movement about the axis of said rail-supporting members; and means operatively connected with said frame members and one strut of each pair for swinging said pairs of struts about said axis.

5. In a wheeled trailer; a frame including members disposed longitudinally of the trailer, a pair of rails; front and rear struts mounting the wheels of the trailer; a pair of rail-supporting members; means joining said rail-supporting members to said frame members; said rail-supporting members extending transversely of said frame members; means axially spaced on said rails and engaged with said rail-supporting members mounting said rails so as to extend longitudinally of the trailer above said frame members; and means joining said struts to said rail-supporting members for swinging movement; and means selectively operable for swinging the front struts relative to the rear struts and vice versa.

6. In a wheeled trailer; a frame including frame members extending longitudinally of the trailer, a pair of rails; pairs of struts mounting the wheels of the trailer; a pair of rail-supporting members; said rails extending longitudinally of the trailer; means mounting said rail-supporting members on said frame members; said rail-supporting members extending transversely of said frame members in outwardly spaced relation to the ends of said frame members; means movable along said rail-supporting members and axially spaced along said rails for supporting said rails for movement relative to said rail-supporting members; and means fixing said struts to said rail-supporting members.

7. In a wheeled trailer; a frame including frame members extending longitudinally of the trailer a pair of load-supporting rails extending longitudinally of the trailer; front and rear struts mounting the wheels of the trailer; front and rear rail-supporting members; means mounting said rail-supporting members on said frame members; said rail-supporting members extending transversely of said frame members in outwardly spaced relation to the ends of said frame members; means engaged with said rail-supporting members and said rails supporting said rails above said frame members; means joining said struts to said rail-supporting members for swinging movement relative to said frame members; and means operatively connected with said frame members and said struts operable for independently swinging said struts.

8. In a wheeled trailer characterized by frame members extending lengthwise of the trailer, a pair of load-supporting rails and pairs of struts mounting the wheels of the trailer: the improvement which includes a pair of rail-supporting members; means joining said rail-supporting members to said frame members for rotative movement relative thereto; said rail-supporting members extending transversely of said frame members in outwardly spaced relation to opposite ends of said frame members; means movable along said rail-supporting members supporting said rails; and means fixing said struts to said rail-supporting members.

9. In a wheeled trailer characterized by frame members, a pair of load-supporting rails and pairs of struts mounting the wheels of the trailer: the improvement which includes a pair of rail-supporting members; means joining said rail-supporting members to said frame for rotative movement relative thereto; said rail-supporting members extending transversely of said frame members in outwardly spaced relation thereto; means movable in either direction along said rail-supporting members supporting said rails; means fixing said struts to said rail-supporting members for swinging movement responsive to rotative movement of said rail-supporting members; and means operatively connected with said frame members and said struts operable for so swinging said struts.

10. In a trailer having frame members, front and rear wheel-supported struts and a load-supporting bed: said bed extending longitudinally of the trailer; the improvement which includes front and rear bed-supporting members; means joining said bed-supporting members to said frame members; means swingably mounting said struts on said bed-supporting members; and means longitudinally spaced on said bed and axially spaced on said bed supporting members mounting said bed on said bed-supporting members for bodily movement relative thereto.

11. In a trailer having frame members, wheel-supported struts and an elongate load-supporting bed: the improvement which includes bed-supporting members; means joining said bed-supporting members to said frame members; means mounting said struts on said bed-supporting members for swinging movement relative thereto; and means mounting said bed on said bed-supporting members for angular movement of said bed about a vertical axis.

12. In a trailer having frame members, wheel-supported struts and a load-supporting bed: the improvement which includes bed-supporting members; means joining said bed-supporting members to said frame members;

means mounting said struts on said bed-supporting members; means spaced along said bed and axially spaced on said bed supporting members mounting said bed on said bed-supporting members for bodily movement relative thereto; and means included in said mounting means for said bed operable to permit angular movement of said bed about an axis located adjacent one end of said bed.

13. In a trailer having frame members, wheel-supported struts and a load-supporting bed: the improvement which includes bed-supporting members; means joining said bed-supporting members to said frame members; means mounting said struts on said bed-supporting members; means mounting said bed on said bed-supporting members for angular movement of said bed about an axis adjacent one end of said bed; said mounting means being longitudinally and laterally spaced on said bed; and means operatively connected with one of said frame members and said bed operable for effecting said angular movement of said bed.

14. In a trailer having frame members, wheel-supported struts and a load-supporting bed: the improvement which includes bed-supporting members; means joining said bed-supporting members to said frame members; means mounting said struts on said bed-supporting members; means located at longitudinally and laterally spaced points on said bed mounting said bed on said bed-supporting members for bodily movement relative thereto; and means included in said mounting means for said bed, operable to permit angular movement of said bed about an axis normal to said bed supporting members; and means operatively connected with one of said frame members and said bed operable for effecting said angular movement of said bed.

15. In a trailer having a wheel-supported frame and a load-supporting bed: the improvement which includes bed-supporting members; means joining said bed-supporting members to said frame; said bed-supporting members extending transversely of said frame; rollers movable on said bed-supporting members supporting said bed for movement relative to said bed-supporting members; and means associated with said rollers operable to permit angular movement of said bed about an axis provided by one of said rollers.

16. In a trailer having a wheel-supported frame and a load-supporting bed: the improvement which includes bed-supporting members; means joining said bed-supporting members to said frame; said bed-supporting members extending transversely of said frame; rollers movable along said bed-supporting members for supporting said bed; means connecting all but one of said rollers to said bed to provide for limited bodily movement of said bed relative to such rollers; means connecting said one roller with said bed; and means restraining bodily movement of said bed relative to said one roller so that said bed may be angularly moved about an axis provided by said one roller while being moved bodily relative to the other of said rollers.

17. In a trailer having a wheel-supported frame and a load-supporting bed: the improvement which includes bed-supporting members; means joining said bed-supporting members to said frame; said bed-supporting members extending transversely of said frame; rollers movable along said bed-supporting members for supporting said bed; means connecting all but one of said rollers to said bed to provide for limited bodily movement of said bed relative to such rollers; means connecting said one roller with said bed; means restraining bodily movement of said bed relative to said one roller so that said bed may be angularly moved about an axis provided by said one roller while being moved bodily relative to the other of said rollers; and means operatively connected with said frame and said bed, operable to effect said angular movement of said bed.

18. In a trailer having a wheel-supported frame and a load-supporting bed: the improvement which includes bed-supporting members; means joining said bed-supporting members to said frame; said bed-supporting members extending transversely of said frame; rollers movable along said bed-supporting members for supporting said bed; means connecting all but one of said rollers to said bed to provide for limited bodily movement of said bed relative to such rollers; means connecting said one roller with said bed; means restraining bodily movement of said bed relative to said one roller so that said bed may be angularly moved about an axis provided by said one roller while being moved bodily relative to the other of said rollers; and means operatively connected with said frame and said bed selectively operable to effect lateral movement of said bed on said angular movement thereof.

19. A trailer comprising a wheel-supported frame; a load-carrying bed; supporting members for said bed mounted transversely of said frame; said bed including a pair of load-supporting rails extending longitudinally of said frame and joined to one another by cross members; rollers movable on said bed-supporting members; means mounting said rollers on said rails; straps connected at their ends with said roller mounting means and forming loops around said bed-supporting members to restrain upward movement of said rollers and rails from said bed-supporting members; and means operatively connected with said frame and said rails for moving said rails relative to said frame.

20. A trailer comprising a wheel-supported frame; a load-carrying bed; supporting members for said bed mounted transversely of said frame; said bed including a pair of load-supporting rails extending longitudinally of said frame and joined to one another by cross members; rollers movable on said bed-supporting members; means mounting said rollers on said rails; straps connected at their ends with said roller mounting means and forming loops around said bed-supporting members to restrain upward movement of said rollers and rails from said bed-supporting members; adjusting screws; means rotatably mounting said screws on said frame; and screw threaded members pivoted on one of said rails and threadedly engaged with said screws; the turning of said screws effecting movement of said rails relative to said frame.

21. A trailer comprising a wheel-supported frame; a load-carrying bed; supporting members for said bed mounted transversely of said frame; said bed including a pair of load-supporting rails extending longitudinally of said frame and joined to one another by cross members; rollers movable on said bed-supporting members; shafts on which said rollers are rotatable; means mounting said shafts on said rails for movement with said rails; the shafts for each of the rollers except one being slidable axially relative to such rollers while the latter remain on said bed-supporting members; means restraining axial movement of the shaft for said one roller relative to said one roller; and means operatively connected with said rails and said frame operable for moving said rails relative to said frame.

22. A wheeled trailer comprising: a pair of frame members extending longitudinally of the trailer; brackets at the ends of said frame member; bearings on said brackets; torque members rotatable in said bearings, front and rear pairs of struts fixed to said torque members; said struts mounting the wheels of the trailer; a pair of load-supporting rails; means joined to and disposing said rails in spaced parallel relation to one another; rollers mounted on said rails to ride along said torque members; means connected with a strut of each pair and to the brackets on the ends of one of the frame members operable to swing the struts about the axis of said torque members for raising and lowering the frame members and said rails as a unit.

23. A wheeled trailer comprising: a pair of frame members extending longitudinally of the trailer; brackets at the ends of said frame members; bearings on said brackets; torque members rotatable in said bearings, front and rear pairs of struts fixed to said torque members; said struts mounting wheels of the trailer; a pair of load-supporting rails; means joined to and disposing said rails in spaced parallel relation to one another; rollers mounted on said rails to ride along said torque members; and means operatively connected with said frame members and a strut, each pair operable selectively to swing the struts into position for tilting, raising or lowering said frame members and said rails.

24. A trailer comprising: a pair of frame members extending longitudinally of the trailer; torque members; means mounting said torque members for rotative movement on said frame members; said torque members extending transversely of and joining said frame members to one another; a pair of load-supporting rails; cross members disposed between and joining said rails together in spaced parallel relation to one another; rollers mounted on said rails to ride on said torque members; pairs of front and rear struts fixed to said torque members to swing about the axis of said torque members; wheels mounted on said struts; and means operatively connected with said struts and said frame members operable selectively to swing said struts into positions for raising, lowering and tilting said frame members and said rails as a unit.

25. A trailer comprising: a pair of frame members extending longitudinally of the trailer; torque members; means mounting said torque members for rotative movement on said frame members; said torque members extending transversely of and joining said frame members to one another; a pair of load-supporting rails; cross members disposed between and joining said rails together in spaced parallel relation to one another; rollers mounted on said rails to ride on said torque members; pairs of front and rear struts fixed to said torque members to swing about the axis of said torque members; wheels mounted on said struts; said cross members having chambers for serving as reservoirs for hydraulic fluid; hydraulically operable mechanisms connected with said struts and said frame members operable selectively to swing said struts into positions for raising, lowering and tilting said frame members and rails as a unit; pump means operatively connected with said mechanisms and said chambers.

26. A trailer of the class described comprising: a wheeled frame; a load-supporting rail assembly including a pair of parallel rails overlying said frame; means located at each end of said frame and each end of said rail assembly supporting said rail assembly on said frame for bodily movement relative to said frame; the supporting means located at one end of said frame and one end of said rail assembly providing an axis about which said rail assembly may be shifted; and means carried by said frame and engaged with said rail assembly for shifting said rail assembly relative to said frame about said axis.

References Cited in the file of this patent

UNITED STATES PATENTS

| | | |
|---|---|---|
| 609,176 | Wolcott | Aug. 16, 1898 |
| 1,169,255 | Graham | Jan. 25, 1916 |
| 1,310,144 | Schneider | July 15, 1919 |
| 1,603,821 | Watters | Oct. 19, 1926 |
| 1,824,201 | Eisenberg | Sept. 22, 1931 |
| 2,059,205 | Buffington | Nov. 3, 1936 |
| 2,174,415 | Curtis | Sept. 26, 1939 |
| 2,610,865 | Cantrell | Sept. 16, 1952 |
| 2,611,641 | Stockwell | Sept. 23, 1952 |
| 2,806,710 | Mascaro | Sept. 17, 1957 |

FOREIGN PATENTS

| | | |
|---|---|---|
| 821,175 | Germany | Nov. 15, 1951 |
| 158,668 | Great Britain | Feb. 7, 1921 |